(12) United States Patent
Lang

(10) Patent No.: US 6,699,044 B1
(45) Date of Patent: Mar. 2, 2004

(54) ROSARY DEVICE FOR A STEERING WHEEL AND METHOD THEREFOR

(76) Inventor: Patricia J. Lang, 3034 N. Ricardo, Mesa, AZ (US) 85215

( * ) Notice: Subject to any disclaimer, the term of this patent is extended or adjusted under 35 U.S.C. 154(b) by 0 days.

(21) Appl. No.: 10/241,928

(22) Filed: Sep. 11, 2002

(51) Int. Cl.[7] .............................................. G09B 19/00
(52) U.S. Cl. ..................................................... 434/246
(58) Field of Search ............................... 434/245, 246; D99/26

(56) References Cited

U.S. PATENT DOCUMENTS

| | | | | |
|---|---|---|---|---|
| 16,081 A | * | 11/1856 | Graham | 37/440 |
| D64,259 S | * | 3/1924 | McDermott | D11/2 |
| 1,704,919 A | * | 3/1929 | Murray | 63/63.2 |
| 1,938,727 A | | 12/1933 | Tammany | |
| 2,730,816 A | | 1/1956 | Garrett | |
| 2,827,161 A | * | 3/1958 | Rosa | 206/19 |
| 2,853,802 A | * | 9/1958 | Castellano | 434/246 |
| 2,956,349 A | | 10/1960 | Hoban | |
| 2,972,819 A | * | 2/1961 | Graham | 434/246 |
| 3,416,989 A | | 12/1968 | Lawler | |
| 4,365,246 A | | 12/1982 | Dewolf et al. | |
| 5,085,098 A | | 2/1992 | Buckley | |
| 6,065,971 A | * | 5/2000 | Lennon | 434/246 |
| 6,179,621 B1 | * | 1/2001 | Vaccari | 434/246 |
| D446,147 S | * | 8/2001 | Cevallos | D11/5 |

OTHER PUBLICATIONS

Gina Keating, "Auto Rosary'Smooths out Road's Bumps", The Catholic Sun, Feb. 20, 2003.*

* cited by examiner

*Primary Examiner*—Kurt Fernstrom
(74) *Attorney, Agent, or Firm*—Jeffrey D. Moy; Harry M. Weiss; Weiss, Moy & Harris, P.C.

(57) ABSTRACT

A rosary device which may be used during activities has a plurality of bead members. A string is slidably coupled to each of the plurality of bead members. The string is of sufficient thickness to prevent the plurality of bead members from freely moving. Connectors are coupled to the string for removably coupling the rosary device to an object.

9 Claims, 1 Drawing Sheet

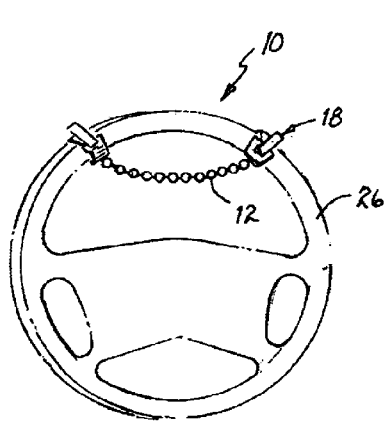
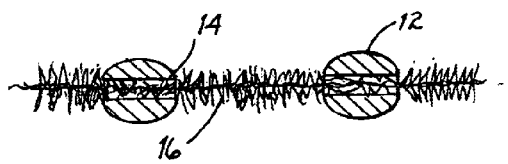
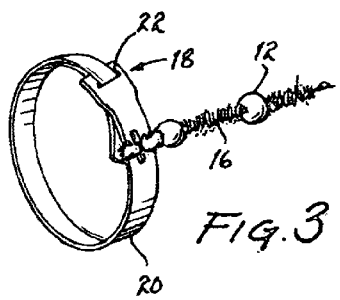
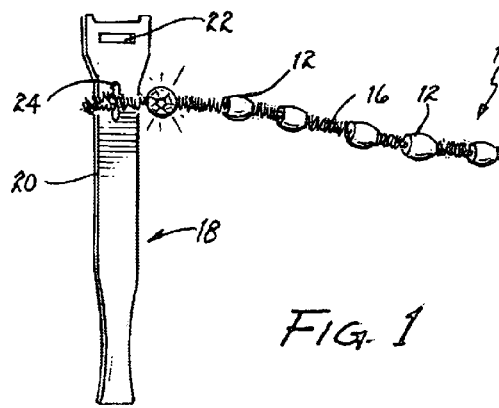
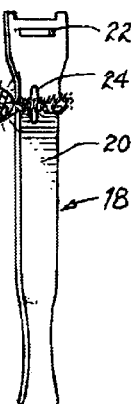
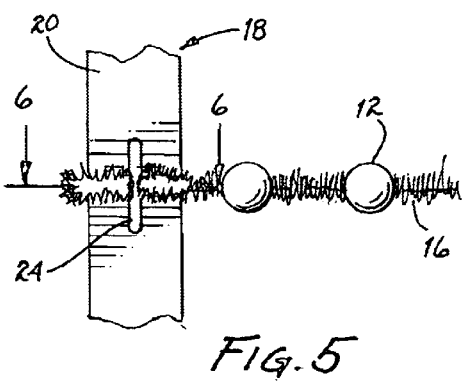
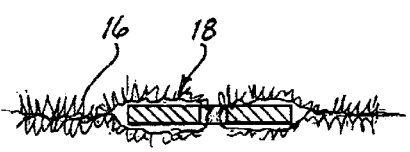

ROSARY DEVICE FOR A STEERING WHEEL AND METHOD THEREFOR

BACKGROUND OF THE INVENTION

1. Field of the Invention

This invention relates generally to religious items and, more specifically, to a rosary device which is removably coupled to a steering wheel so that one may pray the Rosary while in the automobile.

2. Description of the Prior Art

It is customary for members of the Roman Catholic faith to recite prayers consisting of various portions which collectively make up the rosary. When "praying the Rosary", the following steps are involved: 1) Make the Sign of the Cross and say the "Apostle's Creed"; 2) Say the "Our Father"; 3) Say three "Hail Marys"; 4) Say the "Glory be to the Father"; 5) Announce the First Mystery; then say the "Our Father"; 6) Say ten "Hail Marys," while meditating on the Mystery; 7) Say the "Glory be to the Father"; 8) Announce the Second Mystery; then say the "Our Father". Repeat 6 and 7 and continue with Third, Fourth and Fifth Mysteries in the same manner.

When praying the Rosary, some individuals finger or manipulate a string of rosary beads. Each bead corresponds to a, section of the Rosary. The rosary beads allow one to count the number of times that a selected portion of the prayer has been recited in order to complete the prayer according to the prescribed form.

Many people recite the Rosary prayer while engaging in some form of activity. This makes it extremely difficult to manipulate a traditional rosary with both hands. For example, if a person was driving in an automobile, it would be impossible for the driver to remove both hands from the steering wheel in order to manipulate the traditional rosary.

Therefore, a need existed to provide an improved rosary device. The improved rosary device would allow one to manipulate the improved rosary device without using both hands.

SUMMARY OF THE INVENTION

In accordance with one embodiment of the present invention, it is an object of the present invention to provide an improved rosary device.

It is another object of the present invention to provide an improved rosary device that would allow one to manipulate the improved rosary device without using both hands.

BRIEF DESCRIPTION OF THE EMBODIMENTS

In accordance with one embodiment of the present invention, a rosary device which may be used during activities is disclosed. The rosary device has a plurality of bead members. A string is slidably coupled to each of the plurality of bead members. The string is of sufficient thickness to prevent the plurality of bead members from freely moving. Connectors are coupled to the string for removably coupling the rosary device to an object.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 1 is a front view of the rosary device of the present invention.

FIG. 2 is an elevated perspective view of the rosary device of the present invention coupled to a steering wheel.

FIG. 3 is a securing mechanism used in the rosary device of the present invention to secure the rosary device to the steering wheel.

FIG. 4 is a close-up view of one section of the rosary device of the present invention.

FIG. 5 is a close-up view of the securing mechanism and the rosary device of the present invention FIG. 6 is a cross-section view of the rosary device of the present invention taken along lines 6—6 of FIG. 5.

DETAILED DESCRIPTION OF THE PREFERRED EMBODIMENT

Referring to FIGS. 1–6 wherein like numerals and symbols represent like elements a rosary device 10 is shown. The rosary device 10 has a plurality of beads 12. Each bead 12 represents a step in the praying of the Rosary. In the embodiment depicted in the Figures ten beads 12 are shown. However, this should not be seen as to limit the scope of the present invention.

Each bead 12 is constructed in a similar fashion. Each bead 12 is generally spherical or oblong in shape. However, this should not be seen as to limit the scope of the present invention. Other shapes may be used without departing from the spirit and scope of the present invention. A passage way 14 is formed through each bead 12. The passage way 14 goes completely through each bead 12 along a central axis line. The passage way 14 allows all of the beads 12 to be placed on a string member 16. The diameter of the passage 14 and the thickness of the string member 16 is such that the beads 12 will not freely move on the string member 16. Thus, movement of the rosary device 10 will not cause the beads 12 to move along the string member 16. Only by a person applying pressure to the beads 12 with his/her fingers will the beads 12 move along the string member 16. The string member 16 may be a string, rope, pipe cleaner material, and the like. It should be noted that the above are given just as an example and should not be seen as to limit the scope of the present invention.

Coupled to each end of the string member 16 is a connector 18. The connector 18 allows one to removably couple the rosary device 10 to an object. Thus, one does not have to use both hands in order to hold and move the beads 12 of the rosary device 10. The connectors 18 will allow each end of the rosary device 10 to be removably coupled to a device.

In the embodiment depicted in the Figures, each connector 18 is similar to a belt. The connector is comprised of a strip 20. In general, the bottom section of the strip 20 is slightly narrower than the top section. The strip 20 will have an opening 22 located near the top of the strip 20. The opening 22 is where the bottom section of the strip 20 will be inserted in order to secure the connector 18 to an object. Hook and loop material may also be used to secure each end of the strip 20 together. Located just below the opening 22 is another opening 24. The opening 24 is where the string member 16 is coupled to the connector 18. It should be noted that this is just one example of a connector 18. Other connectors may be used without departing from the spirit and scope of the present invention.

As seen more clearly in FIG. 2, each connector 18 is coupled to an object. In FIG. 2, each connector 18 is coupled to a steering wheel 26 of a vehicle. Each connector 18 is secured to the object so that the rosary device 10 cannot be moved. Once in position, one may pray the Rosary while manipulating the beads 12. As stated above, the beads 12 allow one to count the number of times that a selected portion of the prayer has been recited in order to complete the prayer according to the prescribed form. Thus, the rosary device 10 will allow one to pray the Rosary while driving or in a vehicle or during other types of activities.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A rosary device which may be used during activities comprising;
   a plurality of bead members;
   a string slidably coupled to each of the plurality of bead members wherein the string is of sufficient thickness to prevent the plurality of bead members from freely moving; and
   connectors coupled to the string for removably coupling the rosary device to an object wherein each connector comprises a strip of material wherein a bottom section of the strip has a width which is smaller than a top section of the strip.

2. A rosary device which may be used during activities in accordance with claim 1 wherein each of the plurality of beads has a passage way formed through a central axis thereof for allowing each of the plurality of beads to be slidably coupled to the string.

3. A rosary device which may be used during activities in accordance with claim 1 wherein the strip further comprises:
   a first opening located at the top section of the strip for receiving the bottom section of the strip to secure the connector to an object; and
   a second opening located below the first opening for coupling the string to the connector.

4. A rosary device which may be used during activities in accordance with claim 1 wherein the strip has an adhesive to removably couple the connector to an object.

5. A rosary device which may be used during activities in accordance with claim 1 wherein the strip has hook and loop material to removably couple the connector to an object.

6. A rosary device which may be used during activities comprising;
   a plurality of bead members wherein each of the plurality of beads has a passage way formed through a central axis thereof;
   a string slidably coupled to each of the plurality of bead members through the passage way wherein the string is of sufficient thickness to prevent the plurality of bead members from freely moving; and
   connectors coupled to the string for removably coupling the rosary device to an object wherein each connector comprises a strip of material wherein a bottom section of the strip has a width which is smaller than a top section of the strip.

7. A rosary device which may be used during activities in accordance with claim 6 wherein the strip further comprises:
   a first opening located at the top section of the strip for receiving the bottom section of the strip to secure the connector to an object; and
   a second opening located below the first opening for coupling the string to the connector.

8. A rosary device which may be used during activities in accordance with claim 7 wherein the strip has an adhesive to removably couple the connector to an object.

9. A rosary device which may be used during activities in accordance with claim 7 wherein the strip has hook and loop material to removably couple the connector to an object.

* * * * *